(12) United States Patent
Ota et al.

(10) Patent No.: US 8,059,182 B2
(45) Date of Patent: Nov. 15, 2011

(54) DISPLAY APPARATUS, DISPLAY METHOD, PROGRAM AND STORAGE MEDIUM

(75) Inventors: Tomohiro Ota, Kawasaki (JP); Keita Takatani, Yokohama (JP); Hidehiko Morinaga, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/632,994

(22) Filed: Dec. 8, 2009

(65) Prior Publication Data

US 2010/0088643 A1    Apr. 8, 2010

Related U.S. Application Data

(62) Division of application No. 11/487,342, filed on Jul. 17, 2006, now abandoned.

(30) Foreign Application Priority Data

Jul. 19, 2005 (JP) .................................. 2005-209158
Jun. 14, 2006 (JP) .................................. 2006-165367

(51) Int. Cl.
*H04N 5/222* (2006.01)
*G06F 3/048* (2006.01)

(52) U.S. Cl. .............. 348/333.02; 348/333.12; 715/819; 715/823; 715/825

(58) Field of Classification Search ............. 348/333.01, 348/333.02, 333.12; 715/810, 815, 817–821, 715/823, 825, 829, 841–843
See application file for complete search history.

(56) References Cited

U.S. PATENT DOCUMENTS

| 5,463,727 | A | 10/1995 | Wiggins et al. ............... 395/156 |
| 7,096,431 | B2 | 8/2006 | Tambata et al. ............... 715/834 |
| 2003/0112467 | A1 | 6/2003 | McCollum et al. ........... 358/1.18 |
| 2005/0076309 | A1* | 4/2005 | Goldsmith ..................... 715/811 |
| 2005/0086611 | A1* | 4/2005 | Takabe et al. .................. 715/823 |
| 2005/0204311 | A1 | 9/2005 | Kim ............................... 715/823 |
| 2006/0121939 | A1 | 6/2006 | Anwar et al. ............... 455/556.2 |
| 2006/0123360 | A1 | 6/2006 | Anwar et al. .................. 715/810 |
| 2006/0146166 | A1 | 7/2006 | Abe et al. ................. 348/333.01 |
| 2006/0248475 | A1 | 11/2006 | Abrahamsson ............... 715/835 |
| 2007/0028269 | A1 | 2/2007 | Nezu et al. ....................... 725/52 |
| 2008/0066012 | A1 | 3/2008 | Goodwin et al. ............. 715/825 |

OTHER PUBLICATIONS iPod—wikipedia, the free encyclopedia; http://en.wikipedia.org/wiki/IPod accessed Mar. 21, 2011.*
YouTube—iPod Mini Review; http://www.youtube.com/watch?v=qmMjNaBS41s accessed Mar. 21, 2011.*

* cited by examiner

*Primary Examiner* — Daniel M Pasiewicz
(74) *Attorney, Agent, or Firm* — Fitzpatrick, Cella, Harper & Scinto

(57) ABSTRACT

An apparatus and method provides different animations or effects when screens of different groups of icons are switched. This technique prevents a user for mistakenly assuming that icons on different screens necessarily are related to each other, even if they occupy the same location on the screen.

7 Claims, 21 Drawing Sheets ional of U.S. application Ser. No. 11/487,342, filed Jul. 17, 2006, pending.

DISPLAY APPARATUS, DISPLAY METHOD, PROGRAM AND STORAGE MEDIUM

This application is a divisional of U.S. application Ser. No. 11/487,342, filed Jul. 17, 2006, pending.

BACKGROUND OF THE INVENTION

1. Field of the Invention

The present invention relates to a technique for switching and displaying different screens on which a plurality of icons are arranged and displayed on display apparatus.

2. Description of the Related Art

In many information processing apparatus with a display screen, the display of icons is used for indicating setup items or a setup state of various functions or an operational state of the apparatus. In order to display information as much as possible on a limited display area of a cellular phone, for example, or in order to effectively display both of the picked-up image and the playback image from a camera and a state of the apparatus in a digital camera, icons often replace character strings. In a DVD recorder, a known example is that an icon is attached to a character string of an item name for the purpose of facilitating recognition of each item of selection items on a menu screen. According to a hierarchical structure of a user interface, or in order to restrict the screen area, all of a plurality of icons indicating the state or items are seldom displayed on a display screen at one time. In many cases, some icons are switched and displayed in order according to operation of the apparatus or operation of a user.

Assume that an apparatus switches between at least two screens comprising a screen A which arranges and displays a plurality of icons at a particular place in a screen area and a screen B which arranges and displays a plurality of icons different from those in the screen A at the same place or near the same place in the screen area on which icons are arranged in the screen A. In this case, when the two screens are switched in a moment of time, a user may have the following problems.

First, it is not easy for a user to recognize that the screens are switched. This is because the screen A and the screen B have similar configurations and the difference between icons is not as easy to recognize as the difference between character strings.

Second, the user may misunderstand that a group of icons on the screen A and a group of icons on the screen B are strongly related with each other more than they actually are. This is because the icons displayed in the same place on the screen A and the screen B are felt by the user as corresponding to each other one for one. Actually, an icon on screen A does not necessarily correspond to an icon on screen B that is located in the same place as the icon on screen A and may have a completely different meaning.

SUMMARY OF THE INVENTION

Therefore, the present invention is adapted in view of the abovementioned problems, and intends to facilitate the recognition by the user that the screens are switched when screens, on which icons are placed in similar arrangements, are switched.

In order to solve the abovementioned problems, the present invention provides display apparatus including a display unit adapted to display predetermined information, and a control unit adapted to control the display unit so that a different effect is used for switching between different screens.

Further features of the present invention will be become apparent from the following description of exemplary embodiments with reference to the attached drawings.

DESCRIPTION OF THE EMBODIMENTS

Preferred embodiments of the present invention will be described in detail below with reference to attached drawings.

<On Transition from a Photographing Screen to a Main Menu Screen>

In the embodiment, an example of applying the present invention to the transition from a photographing screen to a main menu screen in a digital video camera will be shown.

Embodiments of the present invention will be described below based on the drawings.

Figure 1:
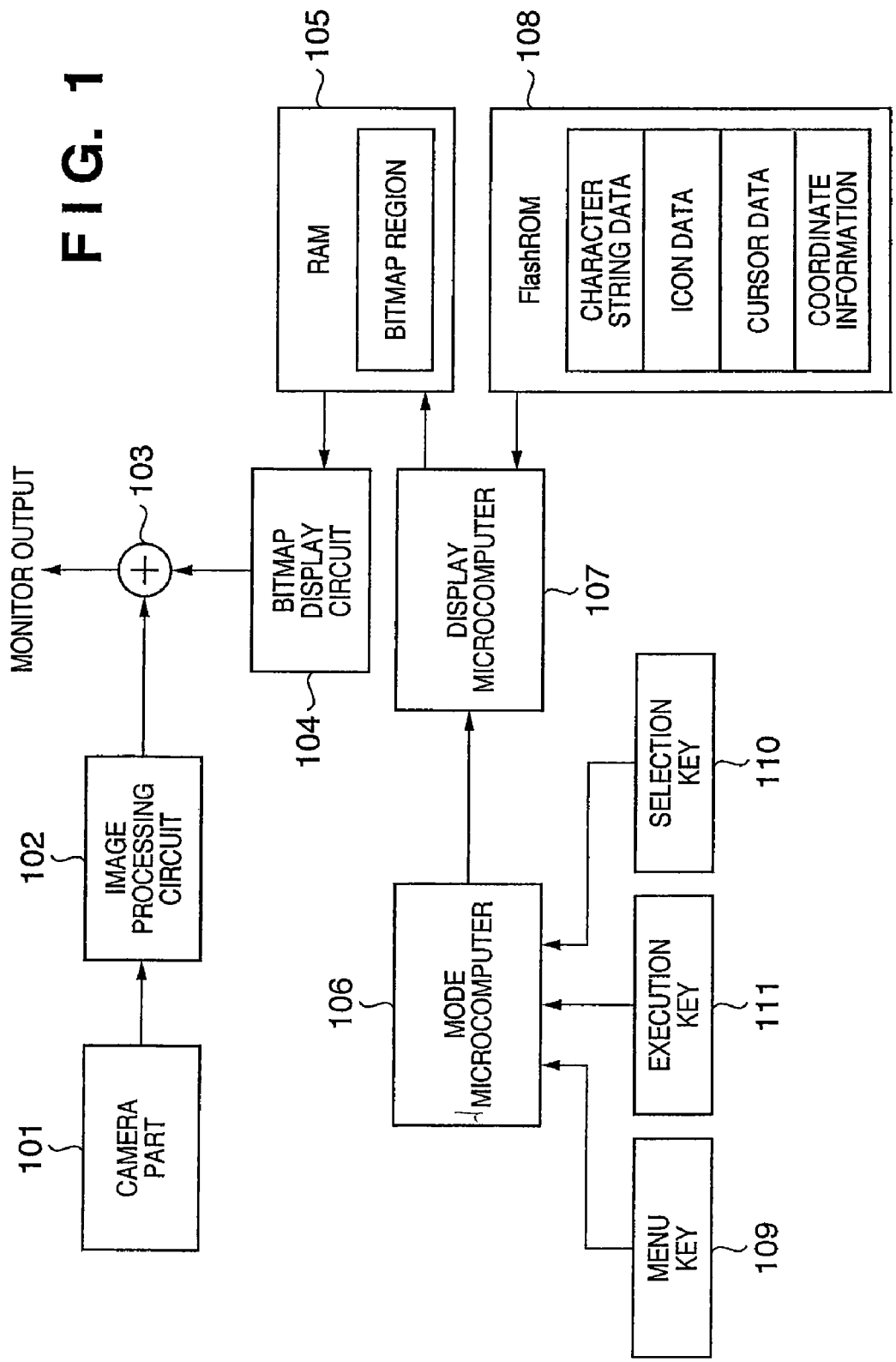
FIG. 1 is a block diagram showing a configuration of a digital video camera according to a first embodiment of the present invention.

FIG. 1 is a block diagram showing a configuration of a digital video camera according to a first embodiment of the present invention.

A digital video camera has a camera part 101 which includes an image sensor and converts an optical object image into electrical image signals.

In such a digital video camera, a mode microcomputer 106 sends an instruction and a set value to a display microcomputer 107 for displaying a setup state of apparatus on a usual photographing screen of a monitor. The display microcomputer 107 receives them and arranges character string data and icon data recorded in FlashROM 108 in a bit map region in RAM 105 according to coordinate information which is also in the FlashROM 108. Data in a bitmap region is read out by a bitmap display circuit 104 and converted into video signals, and combined with video image signals sent from the camera part 101 via an image processing circuit 102 by a combination circuit 103 and outputted to the monitor. A new instruction is sent from the mode microcomputer 106 to the display microcomputer 107 and the display is updated each time the setup state of the apparatus changes.

When a user presses a menu key 109, the mode microcomputer 106 responds to that operation by issuing an instruction to display a menu to the display microcomputer 107. The menu screen is formed by the display microcomputer 107 arranging character string data, icon data, and cursor data on the bitmap region. When a user operates a selection key 110 or an execution key 111, the display microcomputer responds to that operation by rewriting the contents of the bitmap region to reflect it on the outputted image, while the mode microcomputer 106 changes various kinds of setup data of the video camera.

Figure 2:
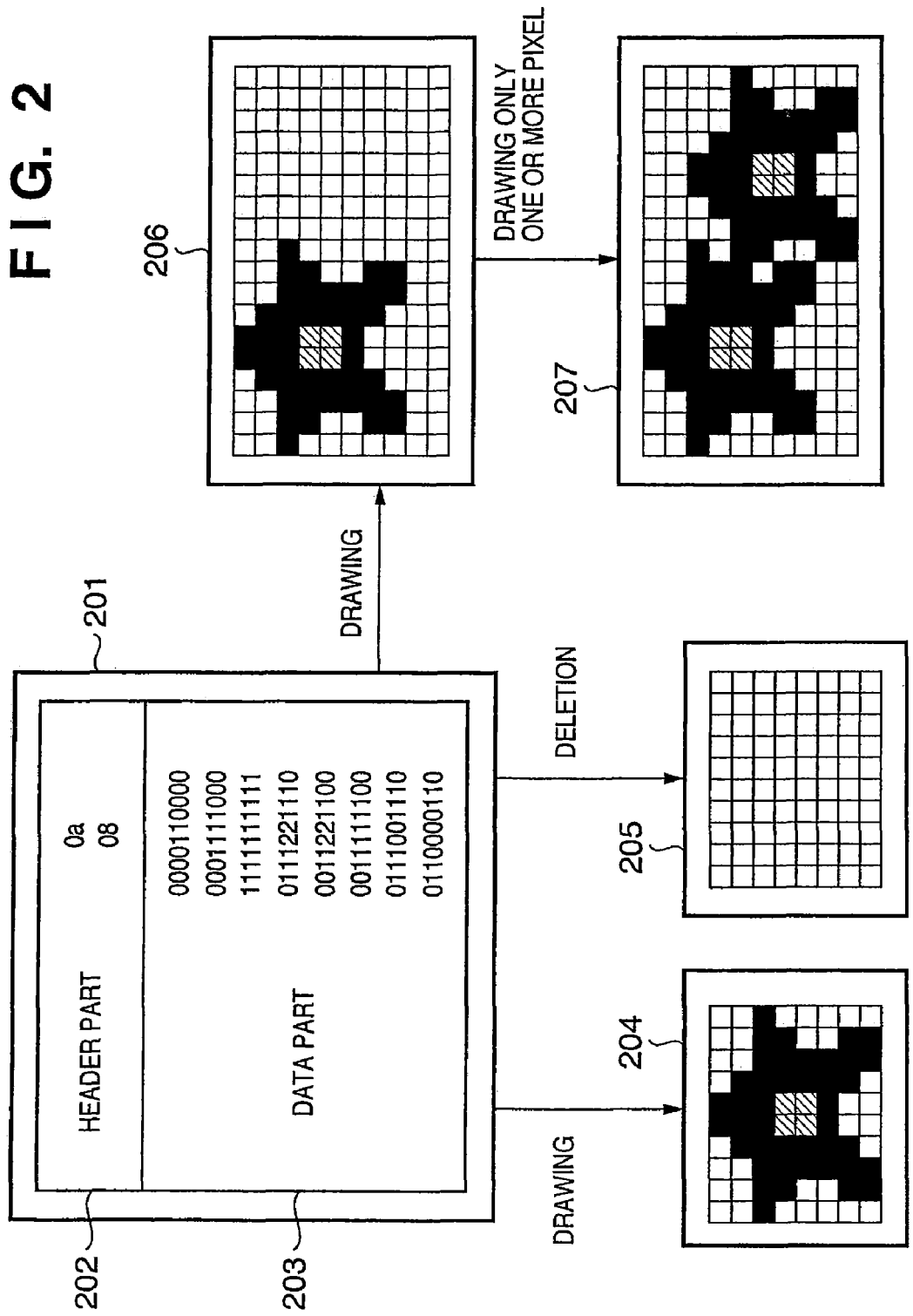
FIG. 2 is a diagram showing drawing and deletion of bit map data.

FIG. 2 is a diagram showing an example of object data, such as an icon or a character, and an example of drawing and deletion.

Object data 201 is largely divided into a header part 202 and a data part 203. The header part 202 records the number of pixels in the breadth direction and the number of pixels in the height direction when object data is placed on the bitmap region. On the other hand, the data part 203 records a pixel map of the object data.

In order to draw the object data 201 in a desired place in the bitmap region, data is copied from the top data of the data part 203 by the pixels in the breadth direction recorded in the header part 202 to a place in the bitmap region where the data is to be drawn. Data is also copied from the next pixel data in the data part 203 by the pixels in the breadth direction to a place a line under the place in the bitmap region. When that operation is repeated for the number of pixels in the height direction, the object data 201 can be drawn in a designated place in the bitmap region as shown by the reference numeral 204.

In order to delete the drawn object data 201 from the bitmap region, data corresponding to a background color only needs to overwrite the data as shown by the reference numeral 205, instead of copying values in the data part 203 to the same place where the data is drawn. The number of pixels in the breadth and the height directions in the deleting operation are also obtained from the header part 202 of the object data 201 in the same way as they are drawn.

When each bit in the data part is referenced and only pixels whose values are one or more is copied to a bitmap region for drawing an image, data can be additionally written in the bitmap region 206 where graphics are already drawn, as shown by the reference numeral 207.

Figure 3:
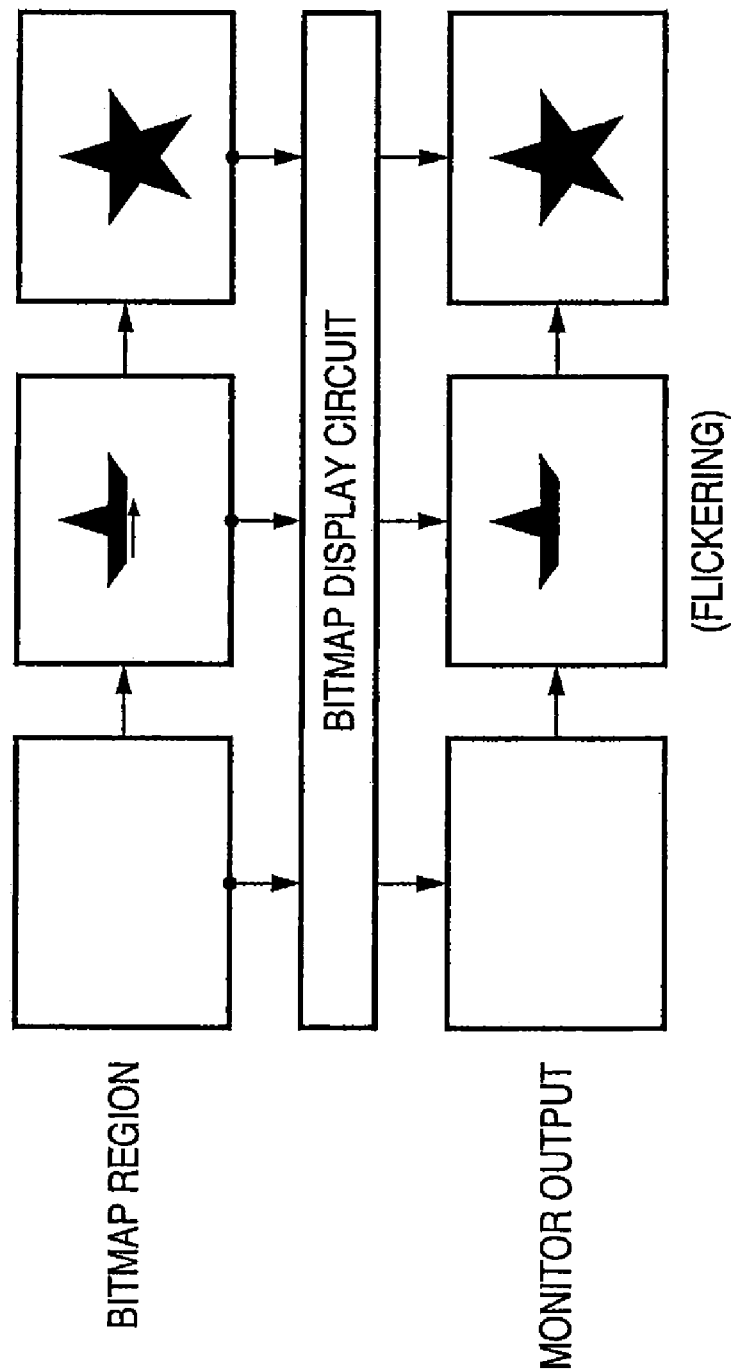
FIG. 3 is a diagram showing a display processing example where double buffering is not performed.

When object data is drawn or deleted in such a way, a certain processing time period is required in writing data into the bitmap region. The bitmap region is scanned by the bitmap display circuit 104 at 60 times/second in NTSC and 50 times/second in PAL, and outputted to a monitor. If the bitmap display circuit 104 scans the region for displaying before drawing or deletion of the object data to or from the bitmap region is completed, data which is uncompleted in being written into the bitmap region is outputted on the monitor. That data appears to a user as flickering on the screen as shown in FIG. 3. If the display microcomputer 107 particularly has a small throughput or has a slow access rate to the RAM 105, such flickering often occurs.

Figure 4:
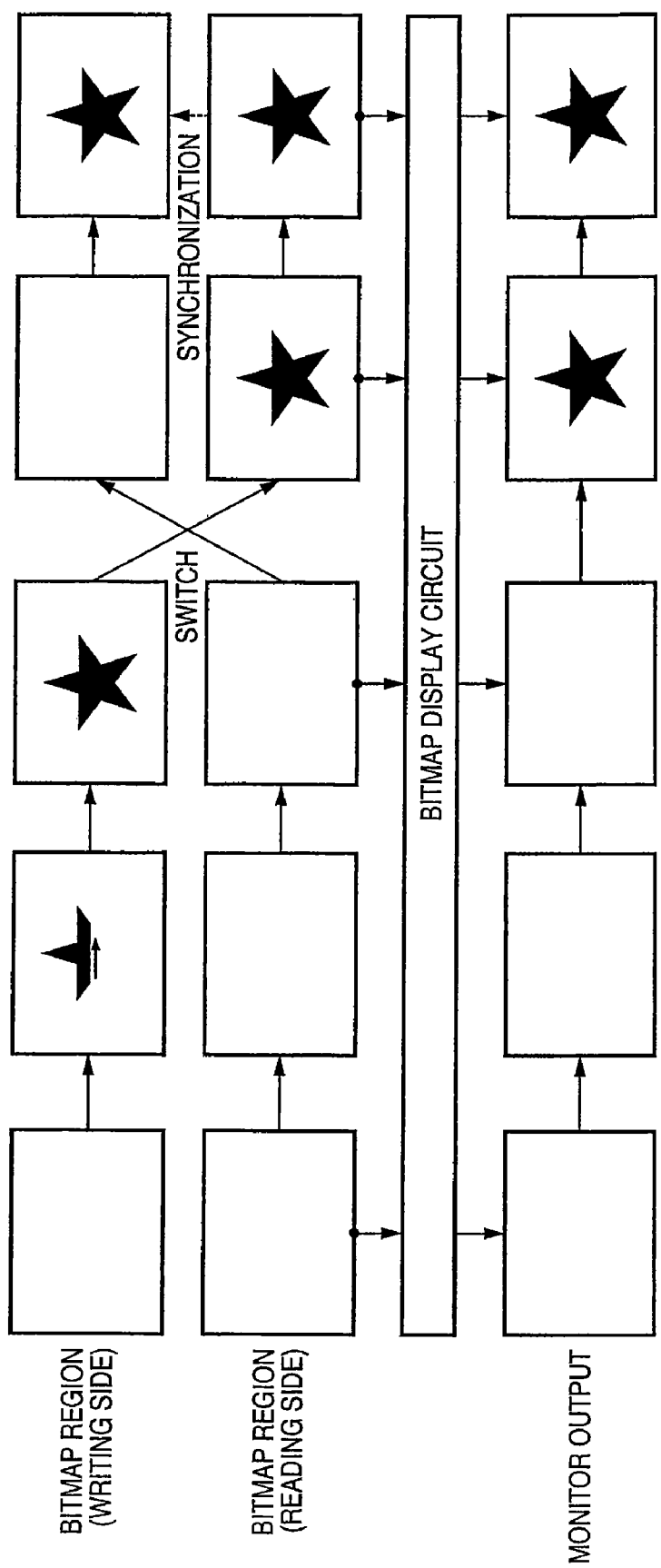
FIG. 4 is a diagram showing a display processing example where double buffering is performed.

In order to solve this problem, double buffering, in which two bitmap regions are included and reading out by a bitmap display circuit is alternatively performed from either region, is effective. In such a case, the bitmap display circuit 104 reads out from one bitmap region, while the display microcomputer 107 is writing in the other bitmap region, as shown in FIG. 4. That causes no flickering. Switching of bitmap regions to be read and written is performed within a blanking period between scans, and is not performed while the other bitmap region is being read.

That double buffering technique is effective when the embodiment is applied to an environment where the display microcomputer 107 has a small throughput or has a slow access rate to the RAM 105.

Next, the operation of the embodiment will be described according to schematic diagrams of screen configurations shown in FIG. 5 to FIG. 8.

Figure 5:
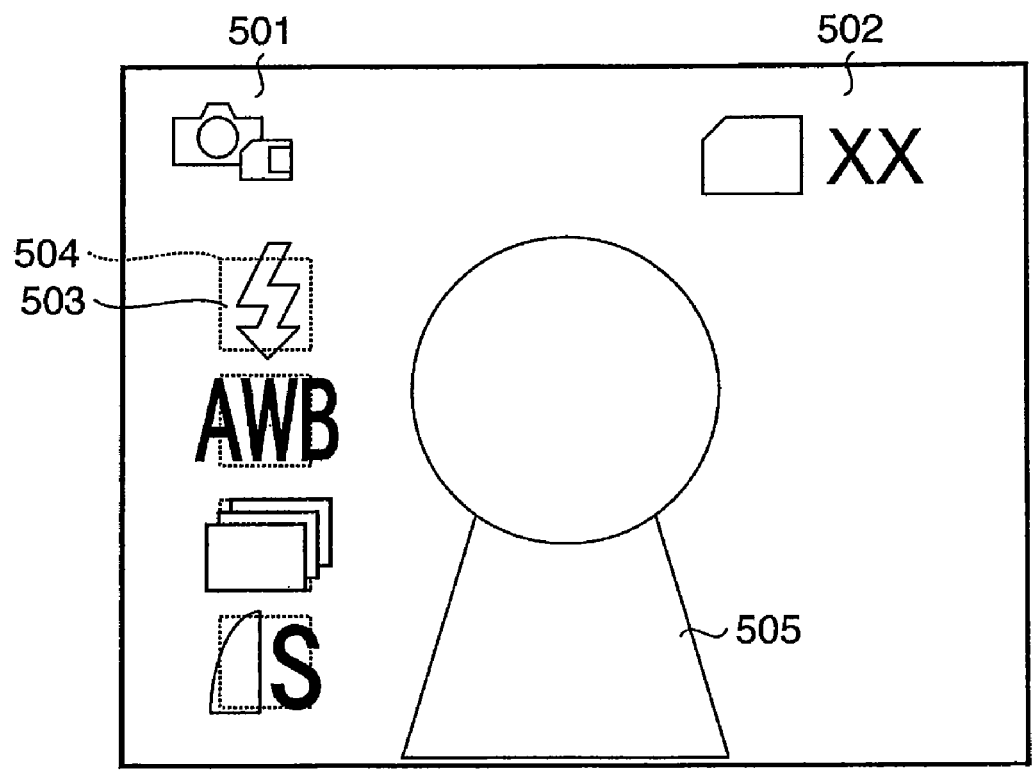
FIG. 5 is a diagram showing a usual photographing screen displayed on a monitor.

In the examples, icons on the photographing screen and icons on the menu screen are specifically shown that are independent elements when operation of the embodiment is applied in transferring a photographing screen to a menu screen in a digital video camera. FIG. 5 is a diagram showing a photographing screen in a card camera mode (mode for photographing a still image and recording it into a memory card).

On a screen of a monitor, icons indicating setup states of a flash, the white balance, a continuous shooting mode and the recording size/image quality are displayed. The reference numeral 502 denotes the remaining amount of the memory card (the remaining number to be photographed). The reference numeral 505 denotes an object to be photographed by the camera, on which icons drawn in the bitmap are displayed.

An icon 501 indicates that it is currently operating in the card camera mode. For icons 503, a group of icons indicating setup states of a flash, the white balance, a continuous shooting mode and the recording size/image quality is displayed from the top in order. These icons are switched to other icons depending on the setup state of the apparatus. Frames of the icons 504 schematically show places where icons of the group of icons 503 are displayed and they are not actually displayed on the screen.

Figure 9:
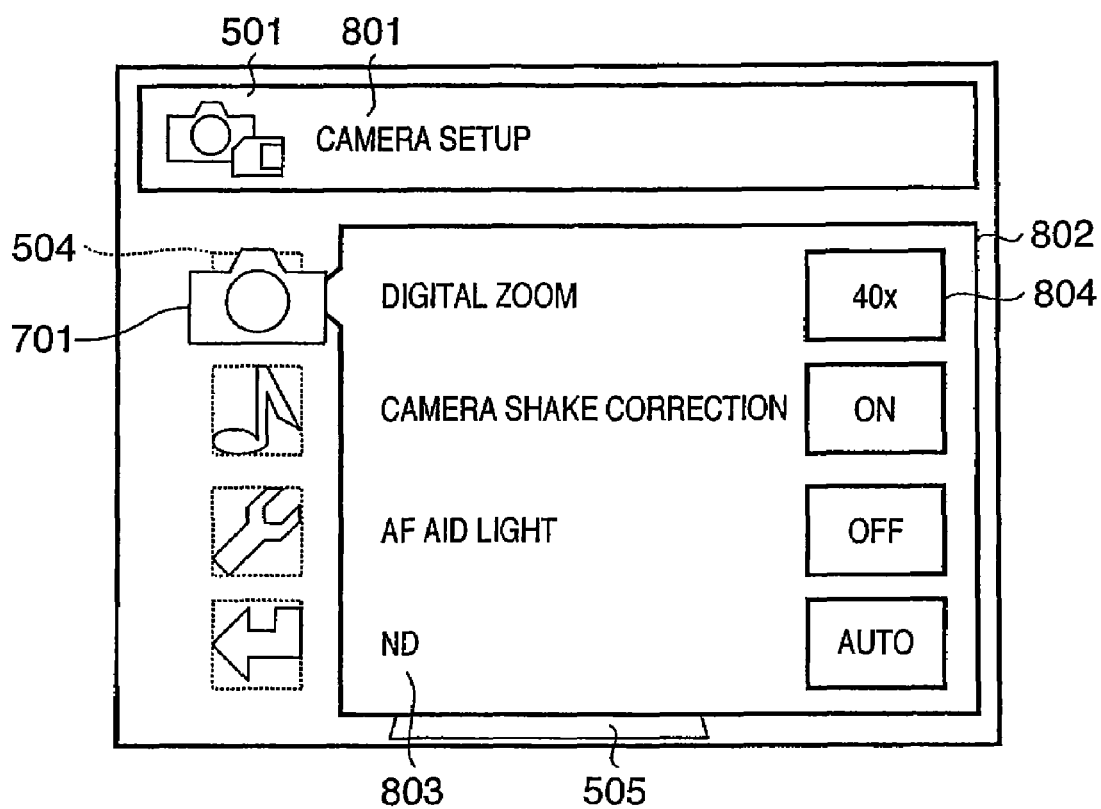
FIG. 9 is a diagram showing the main menu screen displayed on the monitor.

On the other hand, FIG. 9 shows a main menu screen. A group of icons 701 indicates main items. An icon is enlarged and displayed for clearly showing a selected item, with the name of the item being displayed by a character string as shown by the reference numeral 801. A window 802 shows the enlarged icon by a balloon-like cursor. Sub items 803 and their current set values 804 in the selected item are previewed in the window 802.

Here, in FIG. 5 and FIG. 9, the group of icons 503 indicating setup states and the group of icons 701 indicating main items in the menu are arranged in the same places 504 and in the same direction. Accordingly, when the menu key 109 is pressed and the screen is immediately transited from FIG. 5 to FIG. 9, it is not easy for a user to recognize that the screens are switched. Or, the user may mistakenly believe that the group of icons 503 indicating setup states corresponds to the group of icons 701 indicating main items in the main menu one to one and that there is some relationship between the two groups of icons.

Figure 6:
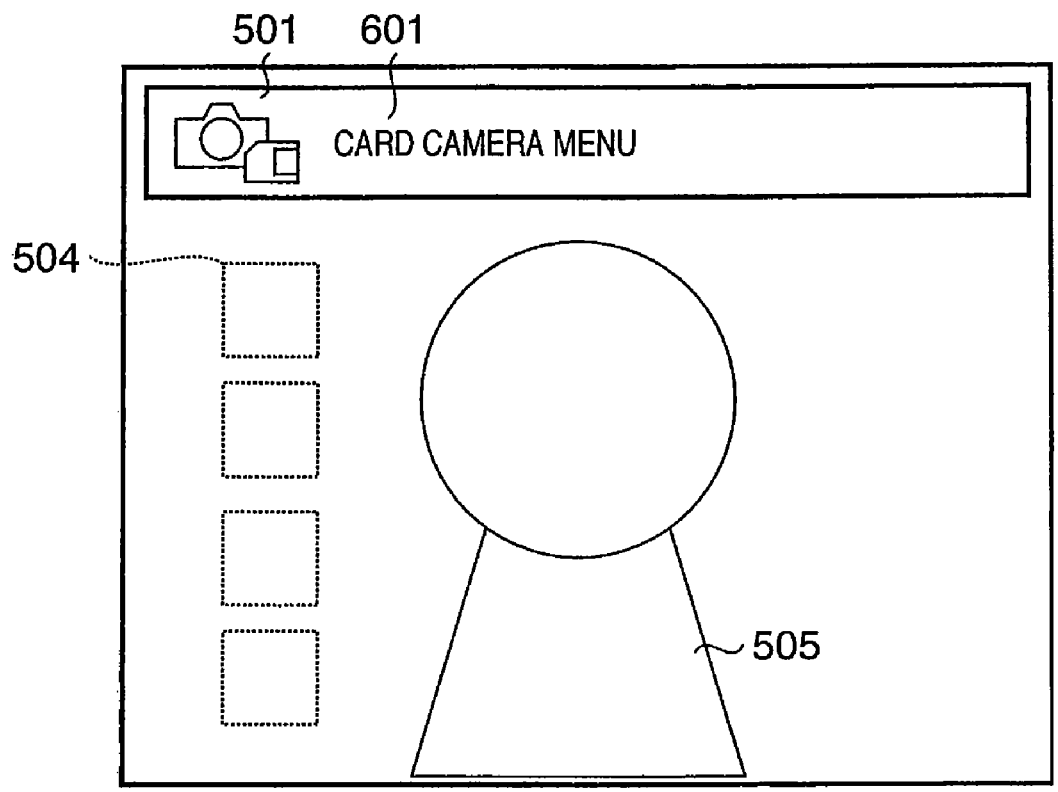
FIG. 6 is a diagram showing a screen before animation operates where a usual photographing screen is switched to a main menu screen.
Figure 7:
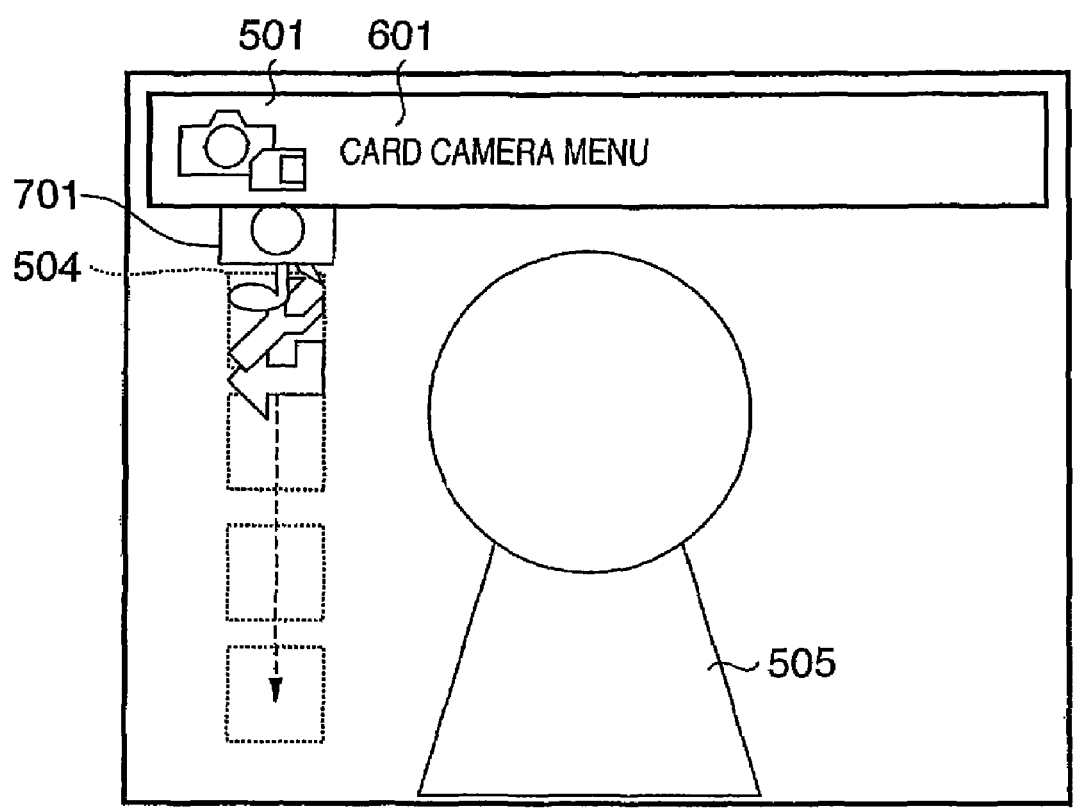
FIG. 7 is a diagram showing a screen on which an animation is operating where the usual photographing screen is switched to the main menu screen.
Figure 8:
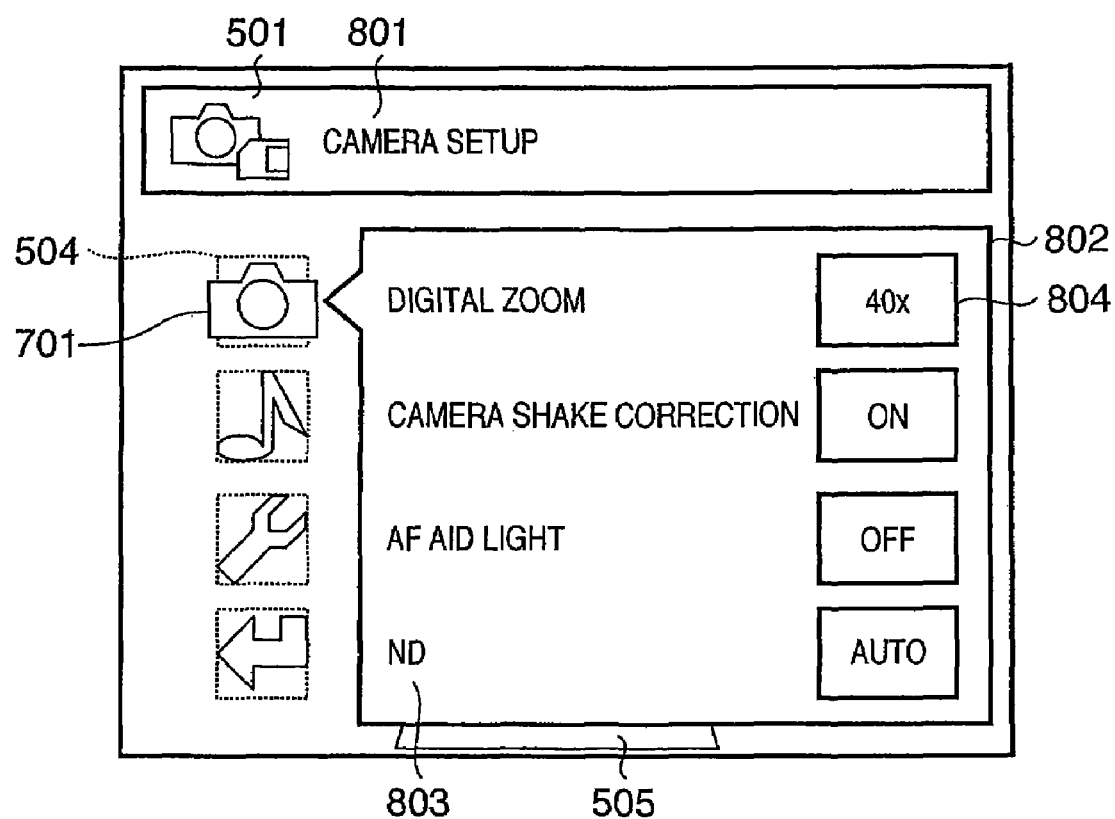
FIG. 8 is a diagram showing the main menu screen displayed on a monitor.

Then, with the animation of FIG. 6 to FIG. 8 being inserted between FIG. 5 and FIG. 9, the appearance of the group of icons 701 after the disappearance of the group of icons 503 is visually shown so that such misunderstanding may be prevented.

Figure 10:
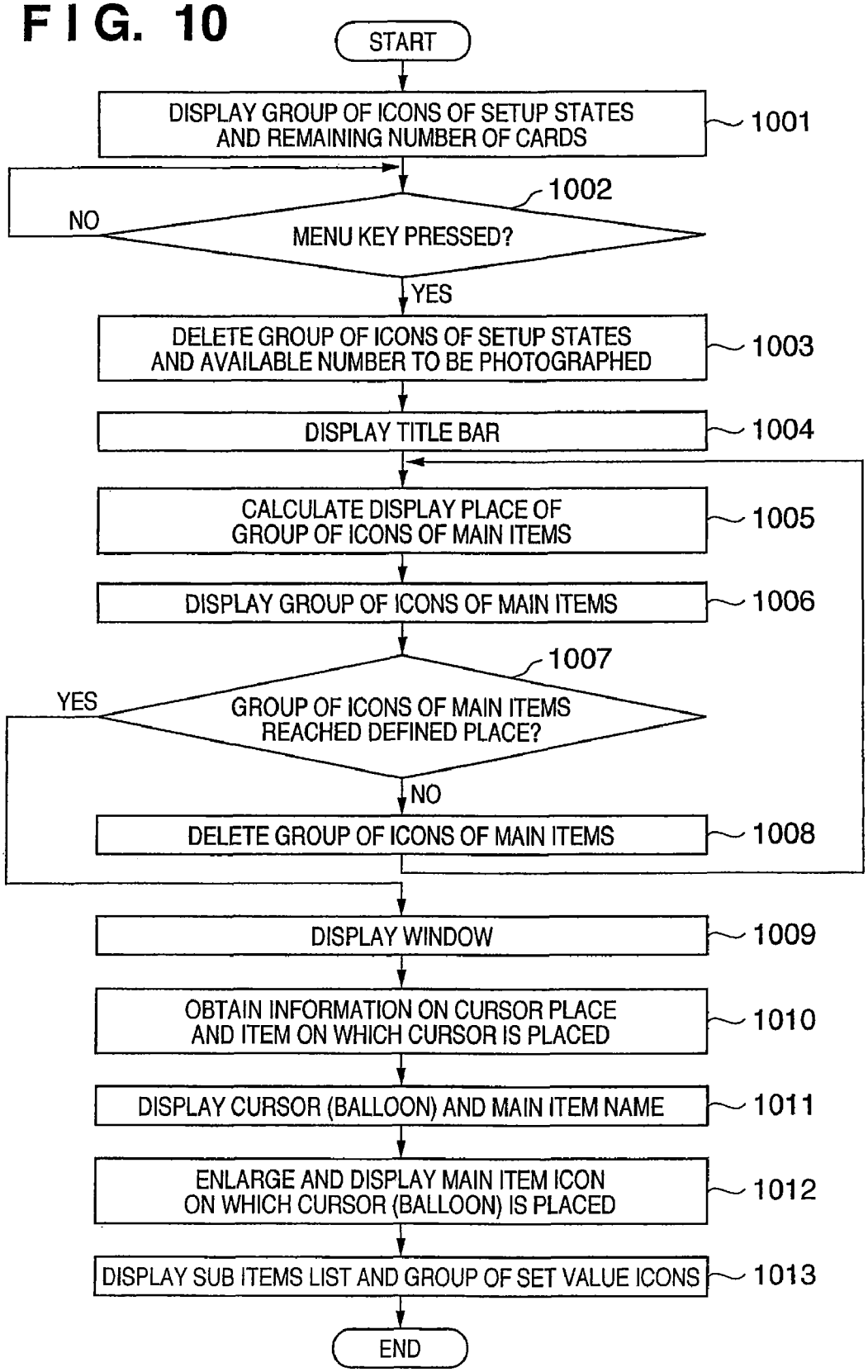
FIG. 10 is a flowchart showing operation of the embodiment of the present invention.

FIG. 10 is a flowchart showing operation of the display microcomputer 107.

First at the step 1001, data of a mode icon 501, the available number to be photographed 502 and the group of icons 503 of setup states is read out from FlashROM 108 based on the set value obtained from the mode microcomputer 106 and drawn to the bitmap region of the RAM 105 to form the screen of FIG. 5. The data drawn in the bitmap region is read out to the bitmap display circuit 104 and outputted to the monitor through the combining circuit 103. When it is determined that the menu key 109 is pressed at the step S1002, the operation proceeds to the step S1003. At the step S1003, the available number to be photographed 502 and the group of icons 503 are deleted, then, a title bar 601 is displayed at the step S1004. FIG. 6 shows that state.

Next at the step S1005, for the group of icons 701 of the main items to be displayed, respective display places are calculated, and at the step S1006, they are displayed as shown in FIG. 7. If it is determined that the group of icons of main items 701 is not displayed at the defined place on the menu screen at the step S1007, the group of icons 701 is deleted at the step S1008 and the next display places are calculated again at the step S1005, and the group of main icons is displayed at the step S1006. As the processing from the step S1005 to the step S1008 is repeated, an animation is performed showing the group of icons 701 inching downward from the top of the screen.

If it is determined that the icons reach the defined places at the step S1007, the window 802 is displayed at the step S1009. At the step 1010, position information on a cursor is obtained from the mode microcomputer 106 and the cursor (balloon) is drawn in that place. As the cursor is placed on "camera setup" in FIG. 8, it is displayed in the title bar 801 at the step S1011. The selected icon is enlarged and displayed at the step S1012, and a sub item character string 801 of the item and each set value 803 are displayed at the step S1013.

On Transition from a Main Menu Screen to a Sub Menu Screen>

Next, transition from the abovementioned main menu screen to the sub menu screen will be described.

Even if icons with different meaning are arranged in the same places in the main menu screen and the sub menu screen, transition of the screens can be clearly shown.

Figure 11:
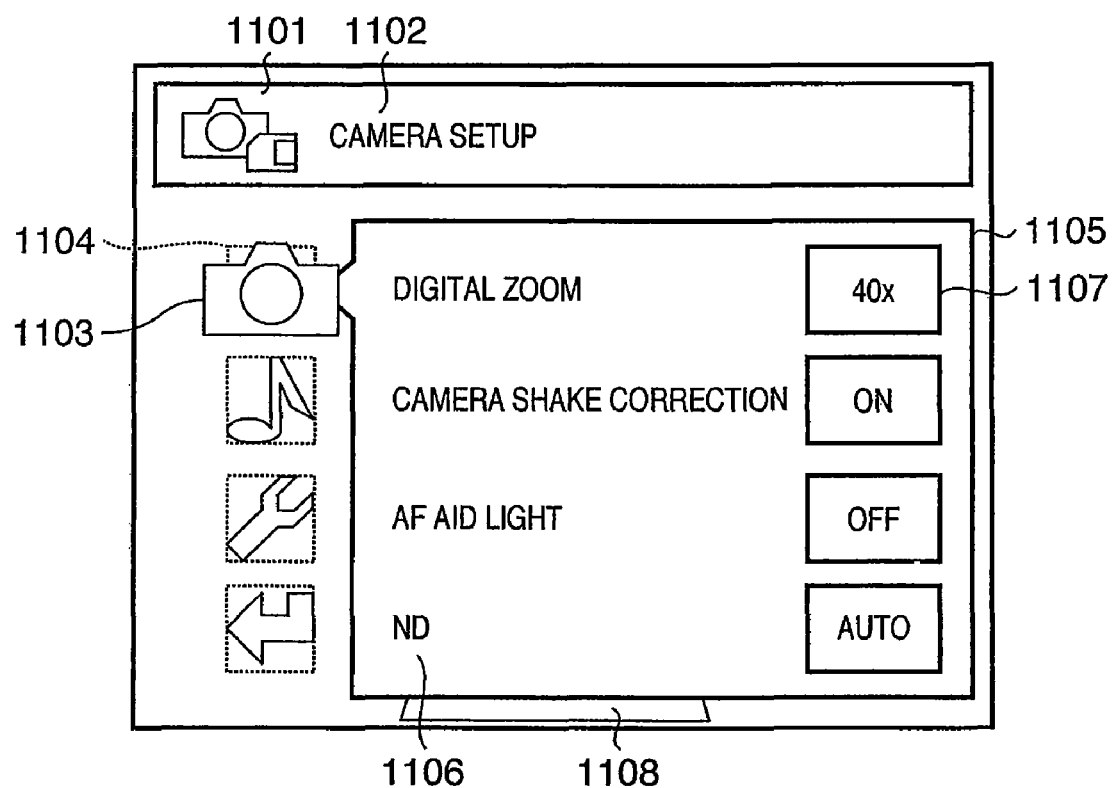
FIG. 11 is a diagram showing a screen before animation operates where the main menu screen is switched to a sub menu screen.

FIG. 11 shows the main menu screen for selecting a main item of a digital video camera.

An icon 1101 represents that it is currently operating in the card camera mode. A group of icons 1103 indicates main items, with the item name of the currently selected icon "camera setup" 1102 is displayed by a character string on the title bar.

The selected icon is enlarged and displayed among the group of icons 1103, with the names of a group of sub items 1106 in the item and the current set values 1107 of respective sub items previewed in a window 1105. Frames of dotted lines 1104 overlapping on respective icons of the group of icons 1103 schematically shows places where icons of the group of icons 1103 are placed, and they are not actually displayed on the screen.

Figure 14:
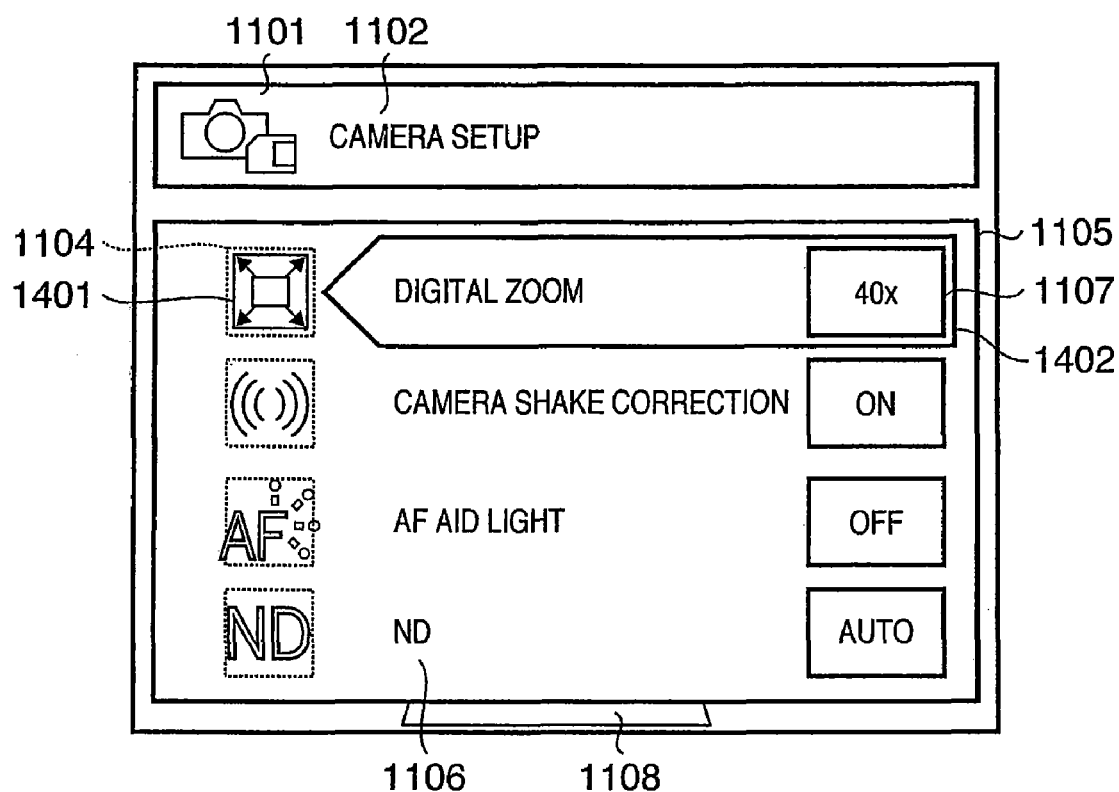
FIG. 14 is a diagram showing the sub menu screen displayed on a monitor.

The reference numeral 1108 denotes an image of an object being photographed, which is hidden behind the window 1105 on the screen. The window 1105 may not be filled with color and may be displayed only with a frame, or may be filled with translucent color. In such a case, the object 1108 can be seen transparent under the window 1105. On the other hand, FIG. 14 shows the sub menu screen which appears after "camera setup" is selected in FIG. 11.

Each sub item is displayed by an icon 1401 and the character string 1106 in the window 1105, with a set value for each item being indicated by an icon 1107. When an item is selected by a cursor 1402, the screen is transferred to the screen for setting the individual sub item. The icon of "camera setup" 1101 selected in FIG. 11 is added to the left of the title display 1102.

Icons of the group of icons 1401 are placed at the frames 1104 in FIG. 11, i.e., in the same places and are laid out in the same direction as those of the group of icons 1103 indicating main items. Accordingly, when the execution key 111 is pressed in the main menu and FIG. 11 is immediately transited to FIG. 14, it is not easy for the user to recognize that the screens are switched. Or, the user may mistakenly assume that icons of the group of icons 1103 and the group of icons 1401 corresponding to each other have a relationship with each other. Then, with animation of FIG. 12 and FIG. 13 being inserted between FIG. 11 and FIG. 14, the appearance of the group of icons 1401 after the disappearance of the group of icons 1103 is visually shown so that such a mistake may be prevented.

Figure 16:
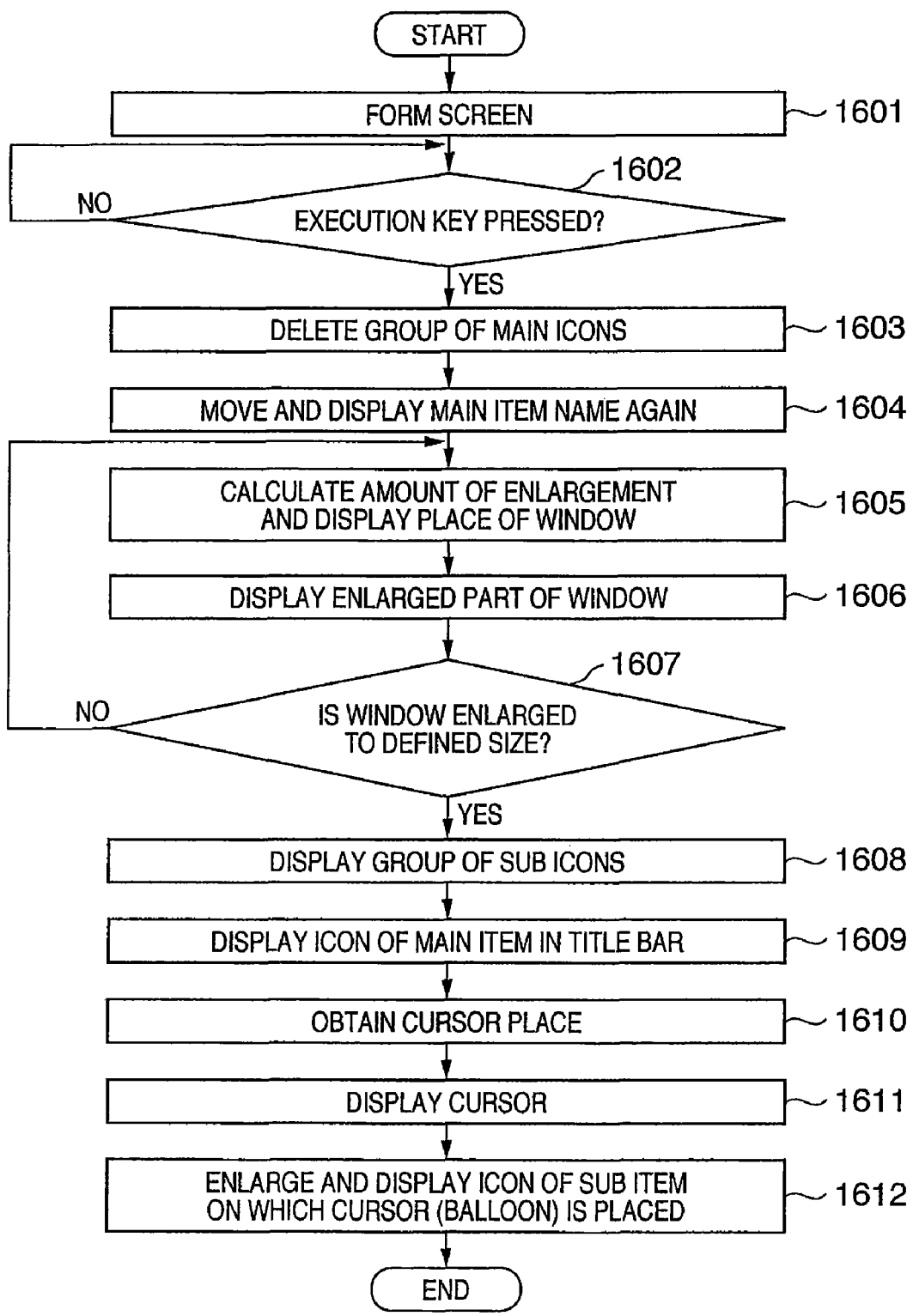
FIG. 16 is a flowchart showing operation of an embodiment of the present invention.

FIG. 16 is a flowchart showing operation of the display microcomputer 107.

Figure 12:
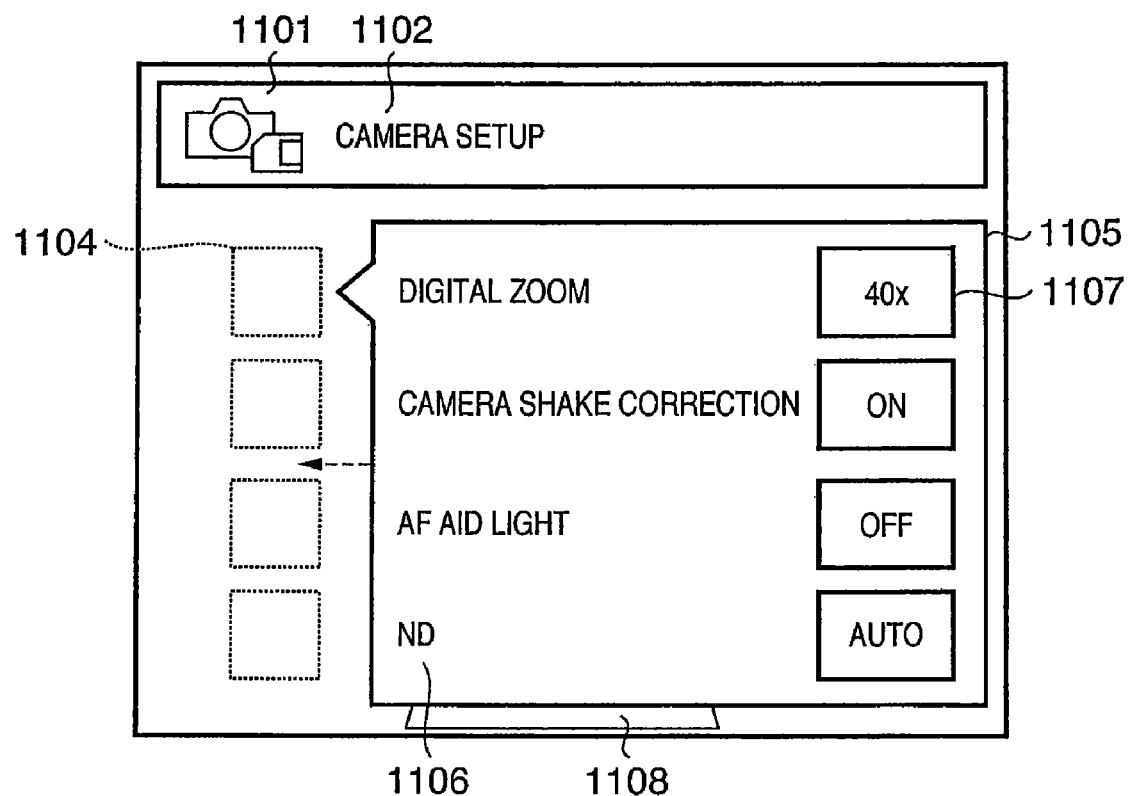
FIG. 12 is a diagram showing a screen before animation operates where the main menu screen is switched to the sub menu screen.
Figure 13:
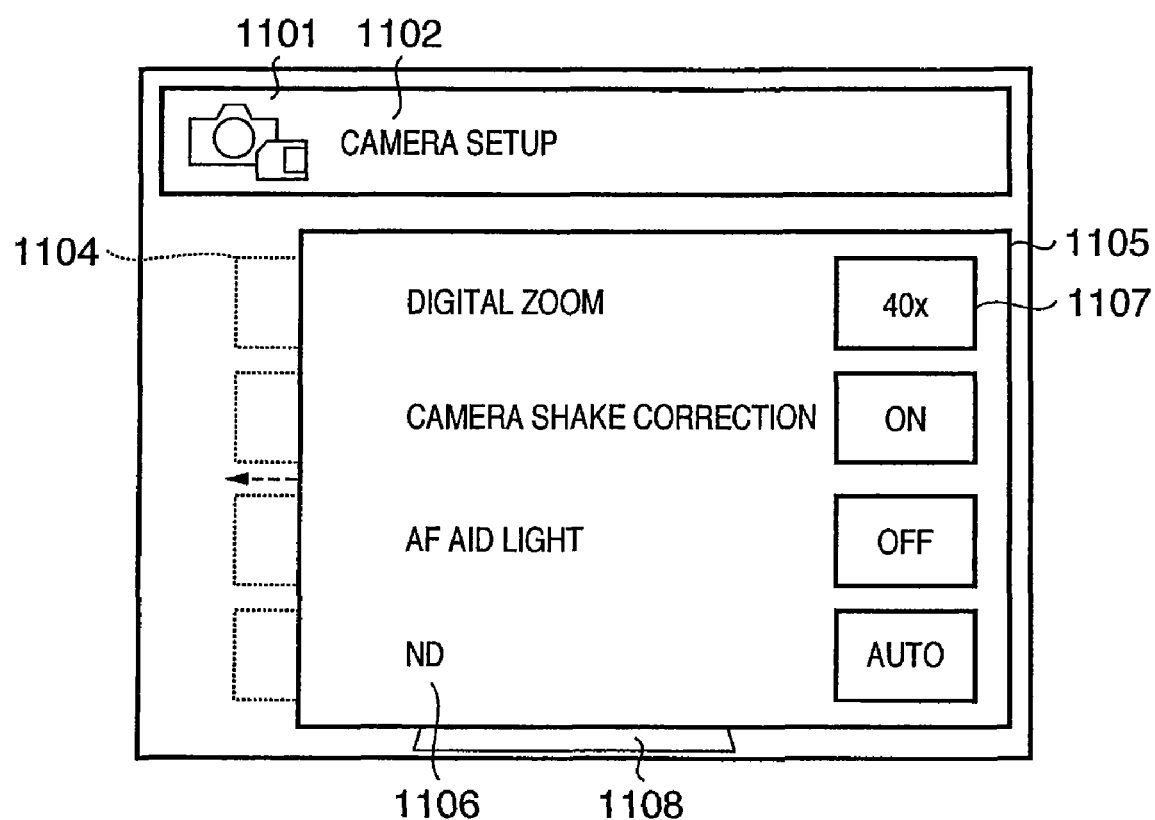
FIG. 13 is a diagram showing a screen on which an animation is operating where the main menu screen is switched to the sub menu screen.

First at the step S1601, when the photographing screen is transited to the main menu screen (processing of FIG. 10), the main menu screen of FIG. 11 is formed. Next, if it is determined that the execution key 111 is pressed at the step S1602, the group of main icons 1103 is deleted at the step S1603. At the step S1604, the place to display the main item in the tile bar is moved, with the state transited to that of FIG. 12. Next at the step S1605, the amount of enlargement of the window and the display place of the enlarged part are calculated, and at the step S1606, the enlarged part is displayed as shown in FIG. 12. If it is determined that the window is not enlarged to the defined size at the step 1607, the next amount of enlargement and the display place are calculated and displayed. By repeating the processing from the step S1605 to the step S1607, an animation is performed showing the window shown in FIG. 13 being enlarged leftward, little by little. At the step S1608, when the window is enlarged to the defined size, the group of icons 1401 of the sub items is displayed in the place 1104 where the main item icons are placed. At the step S1609, the icon of the main item selected for the title bar is displayed. Then, at the step S1610, place information on a cursor is obtained from the mode microcomputer 106. At the step S1611, the screen becomes that of FIG. 14 when the cursor is drawn in the place.

Figure 15:
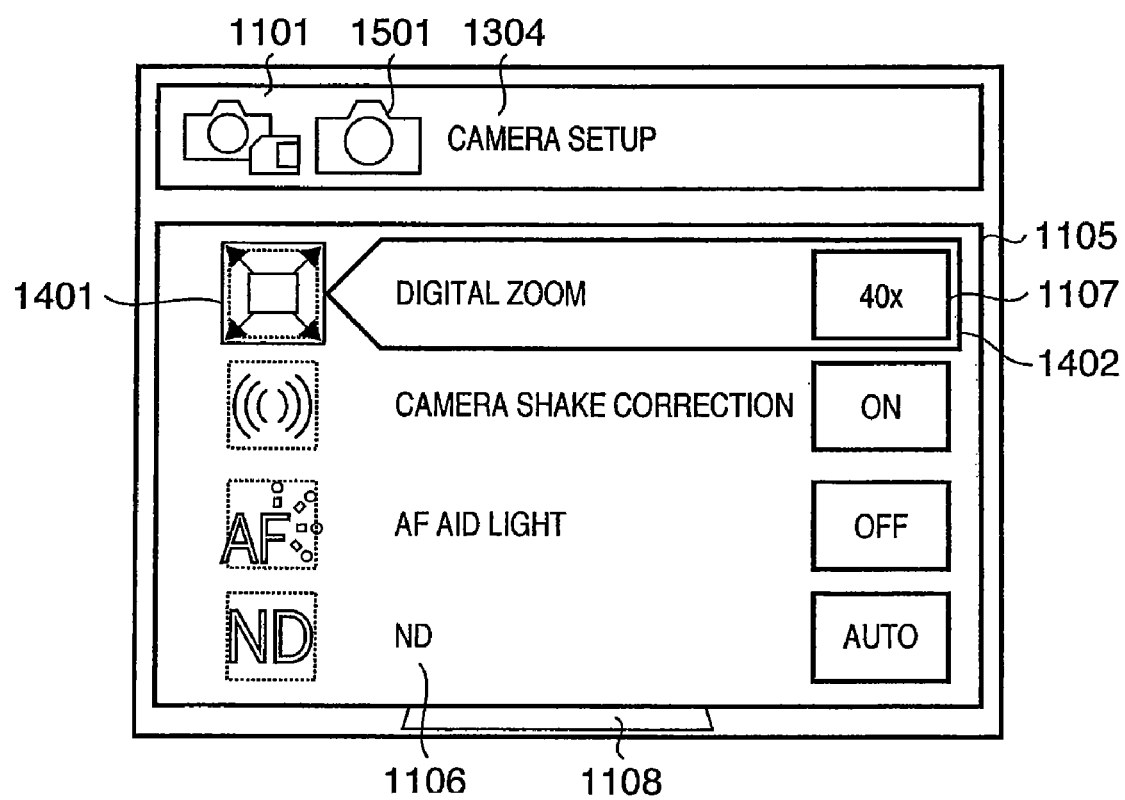
FIG. 15 is a diagram showing the sub menu screen displayed on the monitor.

Further at the step S1612, the selected sub item icon is enlarged and displayed again as shown in FIG. 15.

<On Transition from a Sub Menu Screen to a Setup Screen>

Next, the transition from the sub menu screen to the setup screen on a digital video camera will be described.

If icons with different meanings are arranged in the same places in the sub menu screen and the setup screen, transition of the screens can be clearly shown.

Figure 17:
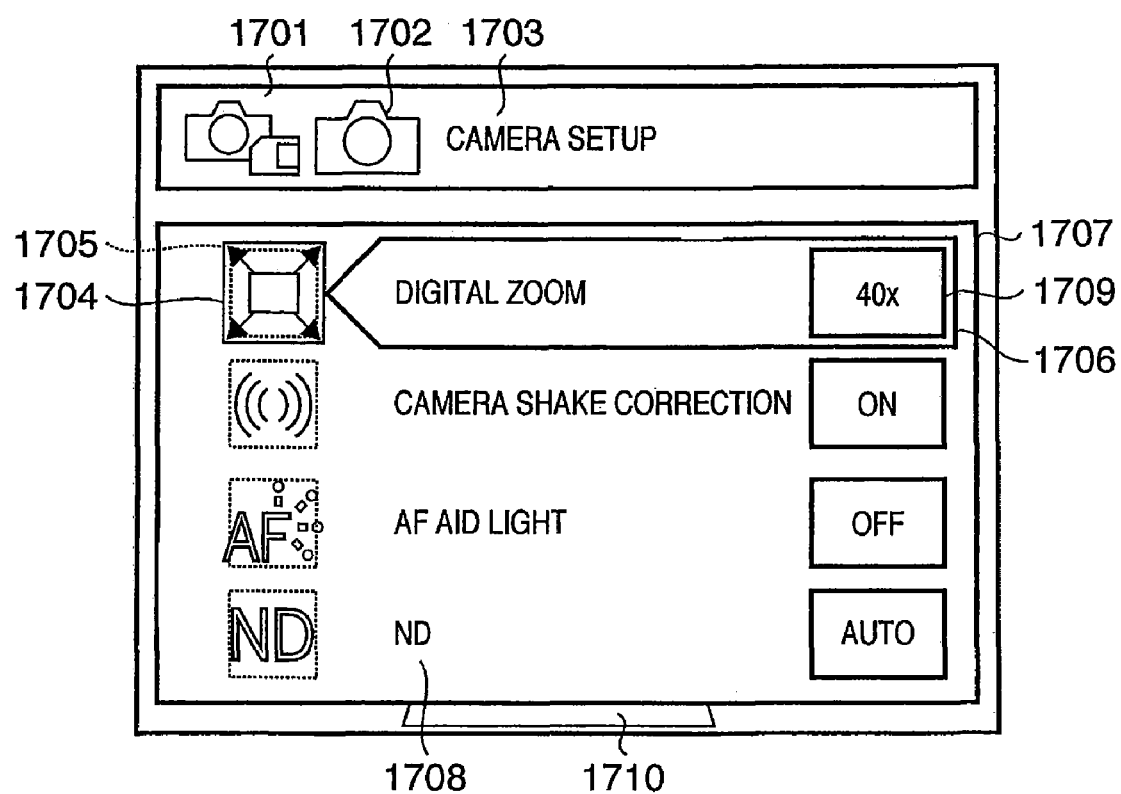
FIG. 17 is a diagram showing a sub menu screen displayed on the monitor.

FIG. 17 shows a sub menu screen for selecting a sub item after a main item is selected.

An icon 1701 represents that it is currently operating in the card camera mode. For an icon 1702 and a title 1703, a main item which is at a higher level of each of the displayed sub items, i.e., a main item which the user has already selected is represented. The group of icons 1704 indicates respective sub items, with the icon selected by a cursor 1706 enlarged and displayed. Frames of dotted lines 1705 overlapping on respective icons of the group of icons 1704 schematically show places where icons of the group of icons 1704 are placed and they are not actually displayed on the screen. To the right of the group of icons 1705, names of the items 1708 and the current set value of the items 1709 are arranged.

Figure 20:
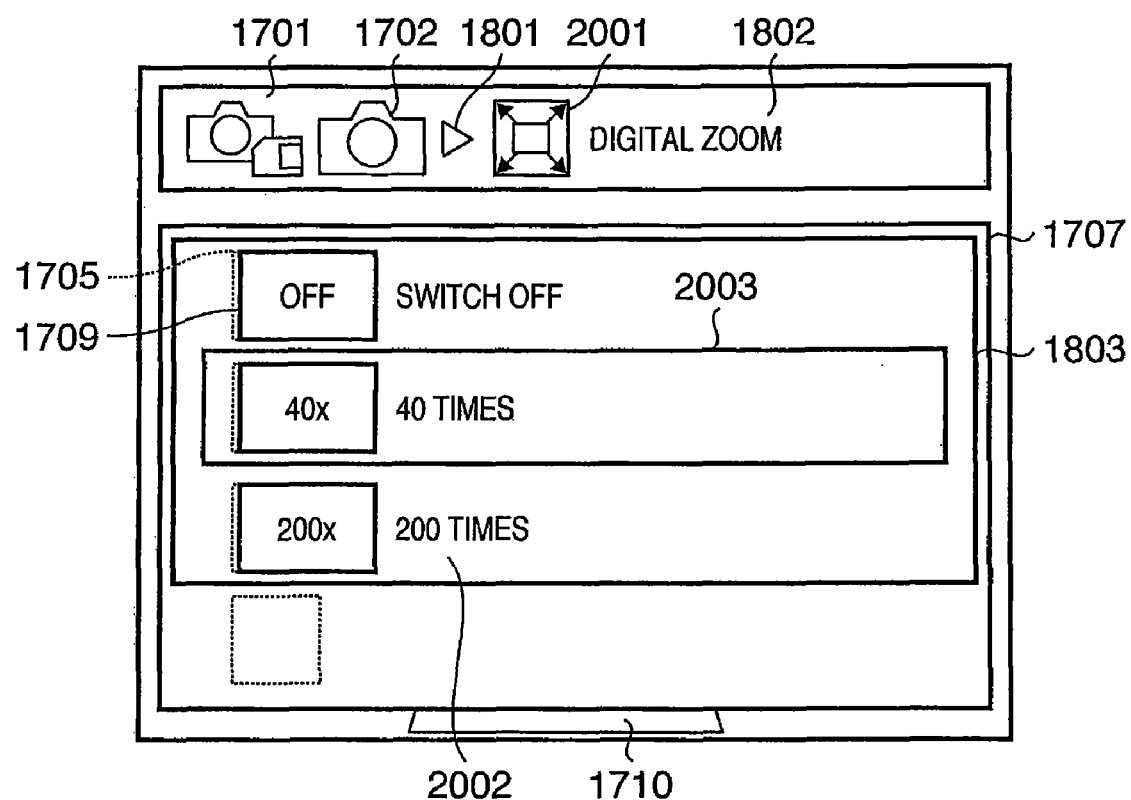
FIG. 20 is showing the setup screen displayed on the monitor.

The reference numeral 1710 denotes an image of an object being photographed, and it is hidden behind the window 1707 on the screen. The window 1707 may not be filled with color and may be displayed only with a frame, or may be filled with translucent color. In such a case, the object 1710 can be seen transparent under the window 1707. On the other hand, FIG. 20 shows setup screen displayed after "digital zoom" is selected in FIG. 17. A small window 1803 is displayed on the window 1707. In the small window 1803, setup items of "digital zoom" are displayed both by an icon 2001 and a character string 1802. The currently selected item is pointed to by a cursor 2003. When the item is pointed to by the cursor 2003 and selected, setting of the sub item (digital zoom) is changed, and the screen can be returned to the screen of FIG. 17.

In the tile bar at the top of the screen, an main item icon 1702 indicating "camera setup" and a sub item icon 2001 indicating "digital zoom" are displayed next to the mode icon 1701 with a triangle 1801 between them. This display visualizes the process from when the menu is opened to when that screen is opened.

Here, the group of icons 1709 are placed in the places of the frames 1705 in FIG. 17, i.e., in the same places of the group of icons 1704 indicating sub items and in the same direction. Accordingly, when the execution key 111 is pressed at the sub menu and the screen is immediately transited from FIG. 17 to FIG. 20, it is not easy for the user to recognize that the screens are switched. Or, the user may mistake that the group of icons 1704 and the group of icons 1709 corresponding to each other have a relationship with each other.

Figure 18:
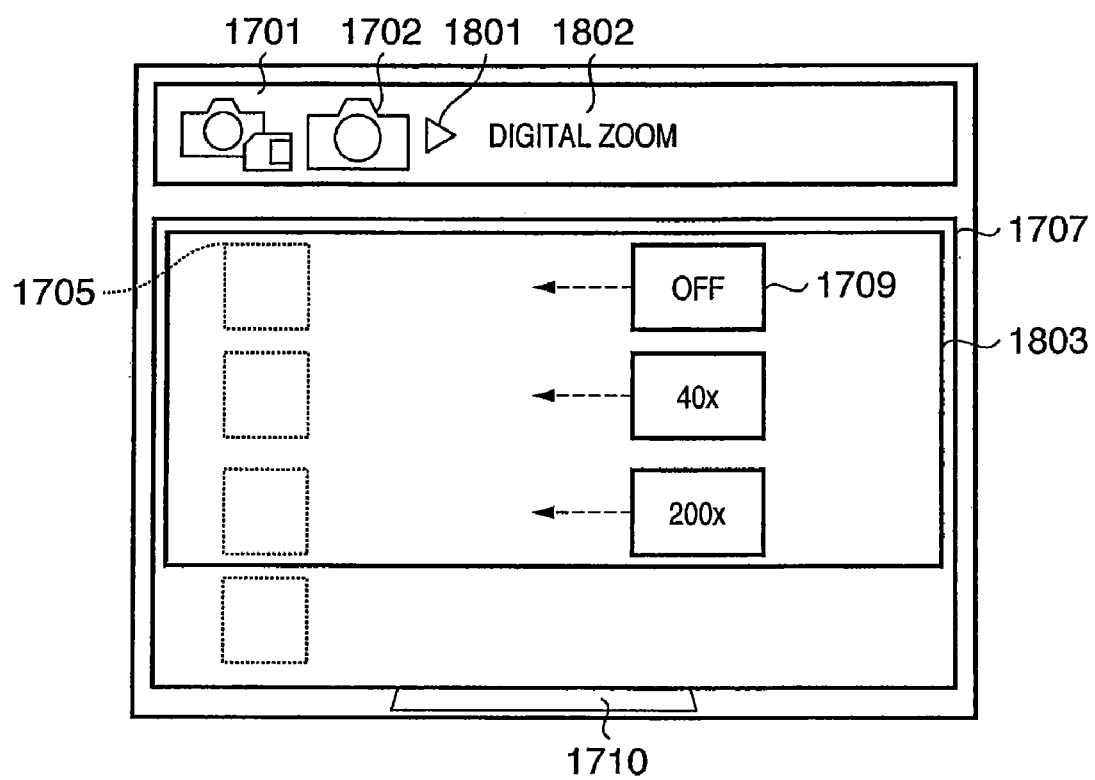
FIG. 18 is a diagram showing a screen on which an animation is operating where the sub menu screen is switched to a setup screen.
Figure 19:
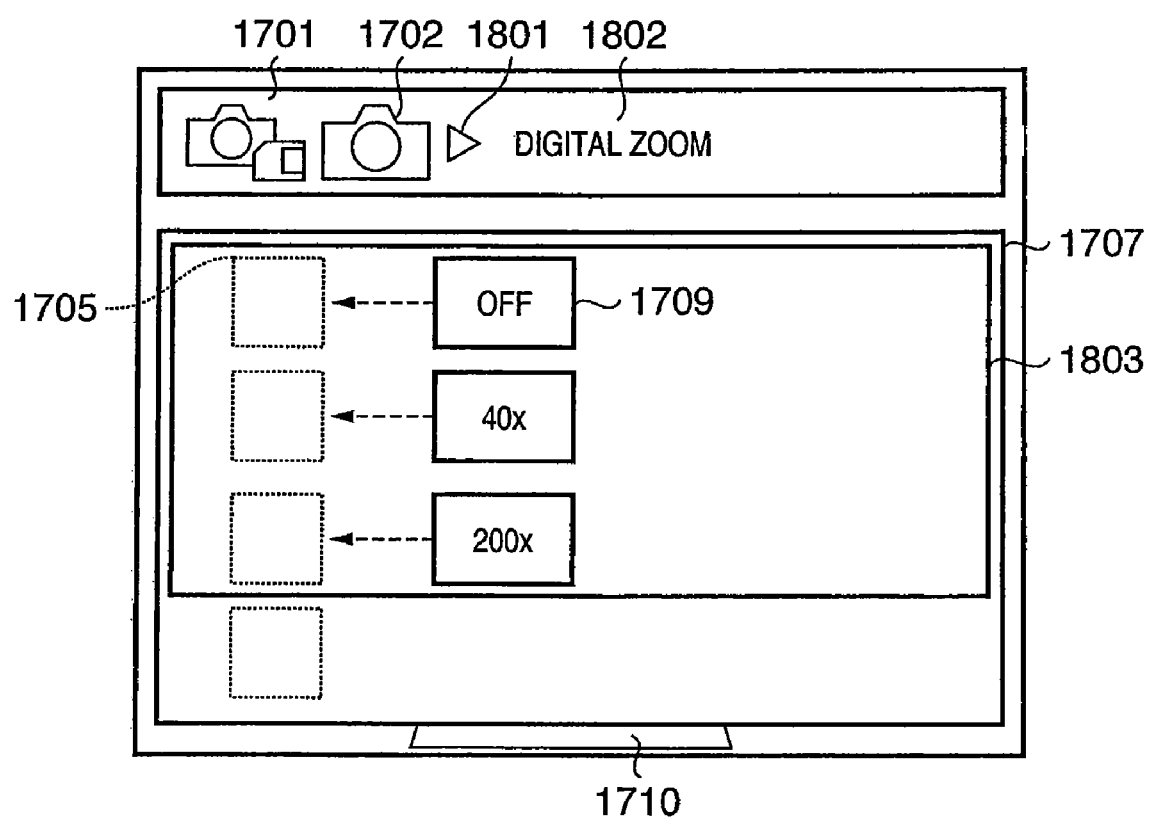
FIG. 19 is a diagram showing a screen on which an animation is operating where the sub menu screen is switched to the setup screen.

Then, with animation of FIG. 18 and FIG. 19 being inserted between FIG. 17 and FIG. 20, the appearance of the group of icons 1709 after the disappearance of the group of icons 1704 is visually shown so that such a mistake may be prevented.

Figure 21:
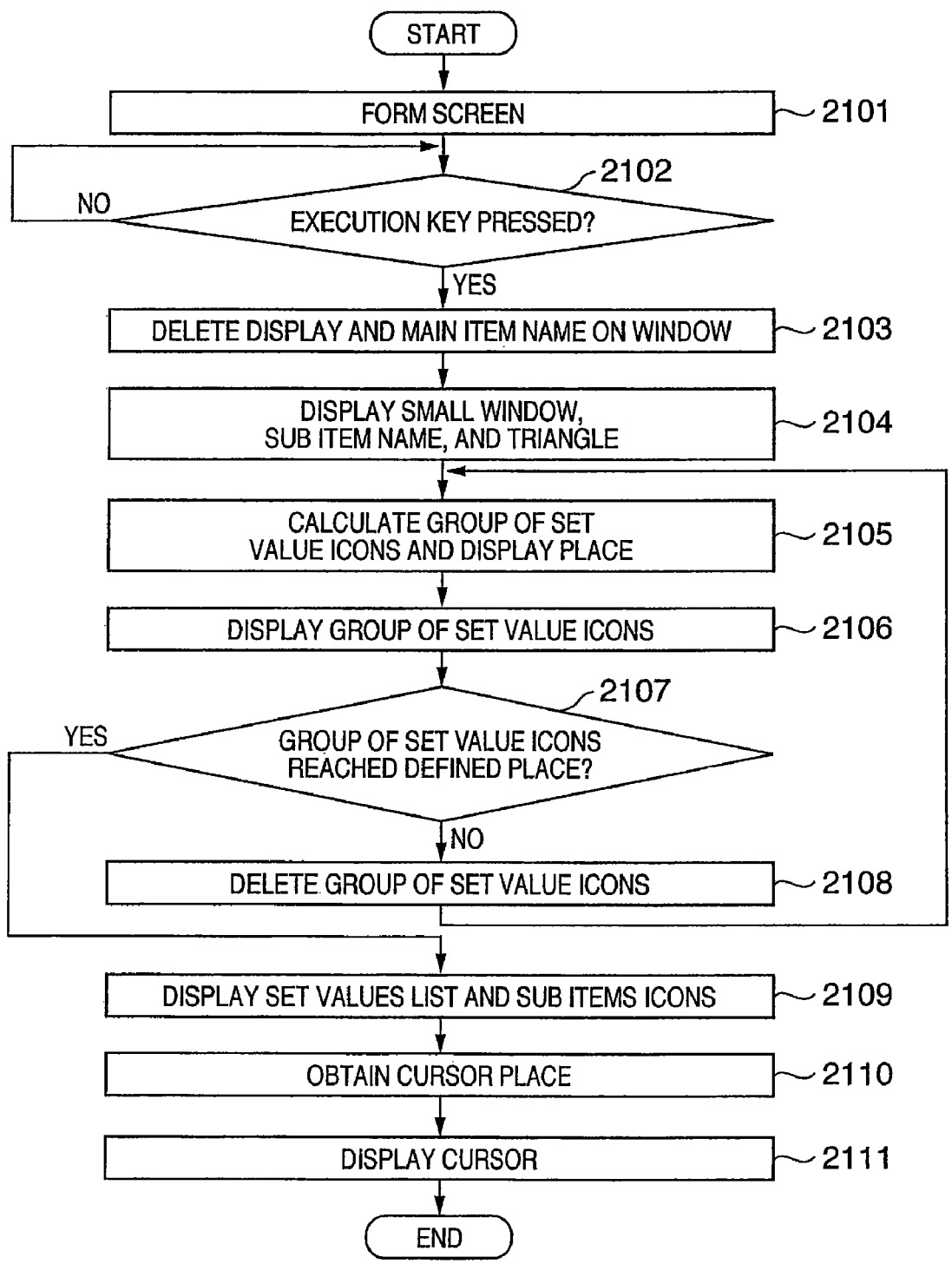
FIG. 21 is a flowchart showing operation of an embodiment of the present invention.

FIG. 21 is a flowchart showing operation of the display microcomputer 107.

First at the step S2101, when the main menu screen is transited to the sub menu screen (processing of FIG. 16), the sub menu screen of FIG. 17 is formed. Next, if it is determined that the execution key 111 is pressed at the step S2102, the group of sub icons 1704 displayed on the window 1707, the sub items list 1708, the group of set value icons 1709, the cursor 1706, and the name of the main item in the title bar "camera setup" 1703 are deleted. Then at the step S2104, the small window 1803 for setup screen, the sub item name in the title bar "digital zoom" 1802, and a triangle 1801 are displayed.

At the step S2105, the display places of the set value icons are calculated, and at the step S2106, they are displayed. At the step S2107, whether the group of set value icons has reached the defined place or not is determined. If it is determined that it has not reached the definite place, the group of set value icons is deleted, the next display places are calculated and displayed at the step S2108. By repeating the processing from the step S2105 to the step S2108, an animation is performed showing the group of set value icons inching leftward from the right of the screen (FIGS. 18, 19).

If it is determined that the group of set value icons has reached a defined place at the step S2107, the set values list 2002 and the sub item icon 2001 on the title bar are displayed at the step S2109. At the step S2110, place information on the cursor is obtained from the mode microcomputer 106. At the step S2111, the screen becomes the screen of FIG. 20 when the cursor is drawn to the place represented by the place information.

According to the embodiment, that the icons are switched as a screen A is transited to a screen B is visually indicated. As an animation is inserted between the screen transitions, the animation can prevent a user from excessively considering the icons in the screen A and the icons in the same place in the screen B to be related to each other.

As described above, according to the embodiment, by changing the animation in the transition process from a usual screen to a main menu screen, and from a main menu screen to a sub menu screen, from a sub menu screen to a setup screen, an operator can easily check the screen to which the current screen is to be transited.

Although the embodiment is described by using a digital video camera, the present invention can be applied to another apparatus which has a display part, such as a digital camera, a cellular phone, a PDA or the like.

Other Embodiments

Needless to say, objects of the present invention can also be achieved when a storage medium (or recording medium) recording program codes of software that realizes functions of the embodiments is supplied to a system or apparatus, and the program codes stored in the storage medium are read out and executed by the system or a computer (or CPU or MPU) of the apparatus. In such a case, the program codes read out from the storage medium realizes the functions of the embodiments and the storage medium storing the program codes forms the present invention. Needless to say, the case where the functions of the embodiments are realized by processing when a computer executes the read out program codes so that not only functions of the embodiments are realized but also an operating system (OS) or the like running on the computer executes a part or all of the actual processing based on an instruction of the program codes is also included.

Also needless to say, the case where the functions of the embodiments are realized by processing when the program codes read out from the storage medium are written in a function extension card inserted in a computer or a memory provided in the function extension unit connected to a computer, and then the function extension card or a CPU or the like provided in the function extension unit executes a part or all of the actual processing based on an instruction of the program code is also included.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-209158, filed Jul. 19, 2005, and Japanese Patent Application No. 2006-165367, filed Jun. 14, 2006, which are hereby incorporated by reference herein in its entirety.

What is claimed is:

1. A display apparatus comprising:

a display unit having a display screen that displays information including a hierarchical menu screen displaying first, second, and third icon groups displayed in first, second, and third hierarchies, respectively;

a switching unit that receives an instruction for switching the hierarchy of the hierarchical menu screen displayed on the display unit; and a display control unit that controls said display unit to display the second hierarchy of the hierarchical menu screen by changing the first icon group displayed on the display screen in the first hierarchy to the second icon group displayed in the second hierarchy, with a first effect when said switching unit receives an instruction to switch the first hierarchy to the second hierarchy in a state that the first hierarchy is displayed on the menu screen, and to display the third hierarchy of the hierarchical menu screen by changing the second icon group displayed on the display screen in the second hierarchy to the third icon group displayed in the third hierarchy, with a second effect different from the first effect when said switching unit receives an instruction to switch the second hierarchy to the third hierarchy in a state that the second hierarchy is displayed on the menu screen, wherein the first effect is a first animation display and the second effect is a second animation display, and the first and second animation displays are different from each other regardless of menu items selected before and after the switching of the hierarchy, wherein the hierarchical menu screen also includes a display area and a window that divides the display area, wherein the first effect is an effect that the first icon group is deleted, the window is moved to a predetermined position with a predetermined size while being displayed as a moving image, and thereafter the second icon group different from the first icon group is displayed at the same positions where the first icon group is displayed, and wherein the second effect is an effect that the second icon group displayed on the display screen is deleted, and thereafter the third icon group is displayed at the same positions where the second icon group is displayed, while being displayed as a moving image.

2. The apparatus according to claim 1, wherein said display control unit controls said display unit to display the second icon group in the second hierarchy at positions where the first icon group is displayed in the first hierarchy, and to display the third icon group in the third hierarchy at positions where the second icon group is displayed in the second hierarchy.

3. The apparatus according to claim 1, wherein icons in the first and second icon groups represent menu items, wherein said display control unit controls said display unit to display information indicating which menu item is selected in the first and second hierarchies until the third hierarchy is displayed.

4. The apparatus according to claim 1, further comprising an image capturing unit that captures an object image, wherein said display control unit controls said display unit to display the icon groups in their associated hierarchy on the hierarchical menu screen while superimposing the icon groups on an image captured by said image capturing unit.

5. The apparatus according to claim 4, wherein icons in the first, second, and third icon groups represent menu items, wherein at least one icon included in the first, second and third icon groups is an icon indicating a menu item for setting an image capturing condition of said image capturing unit.

6. A method of controlling a display apparatus having a display unit including a display screen that displays information including a hierarchical menu screen displaying first, second, and third icon groups displayed in first, second, and third hierarchies, respectively, and a switching unit that receives an instruction for switching the hierarchy of a hierarchical menu screen, said method comprising the steps of:

controlling the display unit to display the second hierarchy of the menu screen by changing the first icon group displayed on the display screen in the first hierarchy to a second icon group displayed in the second hierarchy, with a first effect when the switching unit receives an instruction to switch the first hierarchy to the second hierarchy in a state that the first hierarchy is displayed on the menu screen; and controlling the display unit to display the third hierarchy of the menu screen by changing the second icon group displayed on the display screen in the second hierarchy to the third icon group displayed in the third hierarchy, with a second effect different from the first effect when the switching unit receives an instruction to switch the second hierarchy to the third hierarchy in a state that the second hierarchy is displayed on the menu screen, wherein the first effect is a first animation display and the second effect is a second animation display, and the first and second animation displays are different from each other regardless of menu items selected before and after the switching of the hierarchy, wherein the hierarchical menu screen also includes a display area and a window that divides the display area, wherein the first effect is an effect that the first icon group is deleted, the window is moved to a predetermined position with a predetermined size while being displayed as a moving image, and thereafter the second icon group different from the first icon group is displayed at the same positions where the first icon group is displayed, and wherein the second effect is an effect that the second icon group displayed on the display screen is deleted, and thereafter the third icon group is displayed at the same positions where the second icon group is displayed, while being displayed as a moving image.

7. A non-transitory computer readable storage medium storing a computer program that causes a computer to execute the method defined in claim 6.

* * * * *